UNITED STATES PATENT OFFICE.

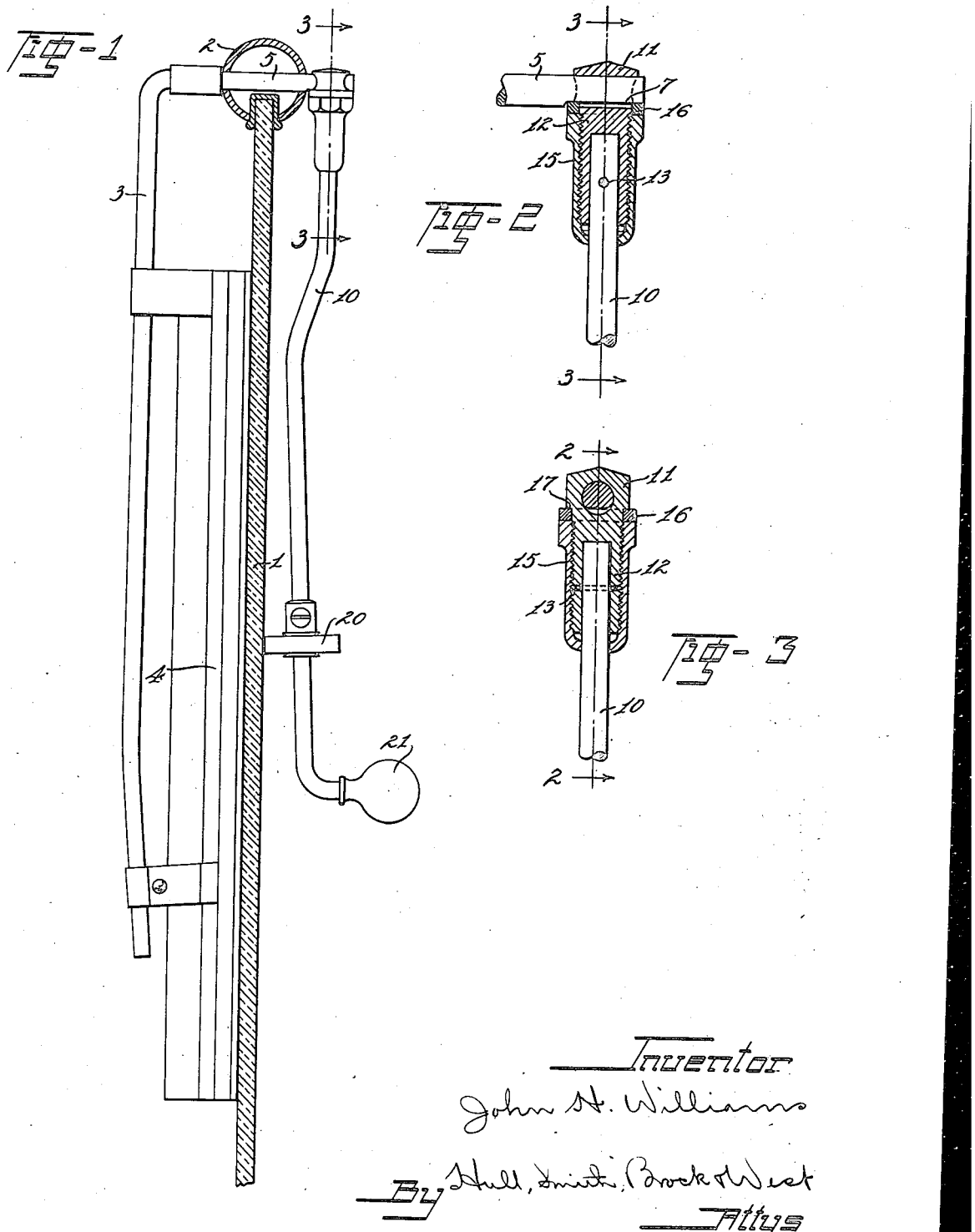

JOHN H. WILLIAMS, OF EAST CLEVELAND, OHIO, ASSIGNOR TO THE OUTLOOK COMPANY, OF CLEVELAND, OHIO, A CORPORATION OF OHIO.

MEANS FOR CONNECTING TWO ELEMENTS.

1,422,158.  Specification of Letters Patent.  Patented July 11, 1922.

Application filed August 19, 1920. Serial No. 404,567.

*To all whom it may concern:*

Be it known that I, JOHN H. WILLIAMS, a citizen of the United States, residing at East Cleveland, in the county of Cuyahoga and State of Ohio, have invented a certain new and useful Improvement in Means for Connecting Two Elements, of which the following is a full, clear, and exact description, reference being had to the accompanying drawings.

This invention relates to improved means for connecting two elements, as a crank or the equivalent thereof and a shaft or spindle designed to be rotated by the crank.

In the present adaptation of my invention it is used for connecting an operating handle to the spindle of a windshield cleaner.

The objects are to provide a comparatively simple and thoroughly efficient means of connecting two elements, as a crank or the like to a shaft or spindle, which connection may be quickly and conveniently made; is very strong; and is neat and attractive in appearance.

In the accompanying drawing constituting a part hereof, Fig. 1 is a sectional view through a windshield equipped with a cleaner incorporating the joint or connection of my invention; Fig. 2 is a sectional view on the line 2—2 of Fig. 3; and Fig. 3 is a section at right angles to Fig. 2 on the lines 3—3 of the former figures.

As my invention is especially designed for and peculiarly adapted to embodiment in a windshield cleaner I have disclosed it in such connection herein, and in the drawing 1 represents the pane of a windshield, such as is used on automobiles, and 2 is the frame thereof. 3 is a rod which carries the squeegee 4 in operative contact with the outer surface of the pane 1 and the upper end of the rod is turned at substantially right angles to the squeegee carrying portion to provide a shaft or spindle 5 that extends through aligning bearing apertures in the opposite sides of the tubular frame 2 and beyond the inner side of the frame the underneath side of the spindle is flattened, as shown at 7.

10 is an operating handle or crank which has a head 11 applied to its upper end. In the present instance the head has a shank 12 that is bored to produce a socket within which the upper end of the operating handle or crank is fitted and the handle is held within the socket and against turning with respect to the head by a pin 13 that passes through aligning transverse holes of the shank and handle. The shank 12 is externally threaded for the application of a sleeved nut 15 and a gib ring or washer 16 interposed between the upper end of the nut and an annular shoulder 17 of the head 11, the shoulder being substantially in the plane of the flattened portion 7 of the shaft or spindle when the head is applied to the spindle and properly adjusted angularly thereof.

With the parts designed and assembled as above described and as illustrated, diametrically opposed portions of the gib ring or washer engage the flattened portion 7 of the shaft or spindle 5 on opposite sides of the head 11, so that by screwing the nut 15 upwardly, the gib ring or washer may be firmly clamped between the nut and spindle so that the operating handle or crank is effectually held against rotation with respect to the shaft or spindle.

A roller 20 is adjustably applied to the operating handle or spindle and bears upon the inner surface of the pane 1, and to facilitate manipulation of the handle or crank, it is equipped at its lower end with a knob 21.

Having thus described my invention, what I claim is:—

1. In combination, a shaft having a flattened portion, a crank having an aperture for the reception of the shaft, means encircling the crank and adjustable longitudinally of the same for engagement with the flattened portion of the shaft for retaining the crank against angular movement with respect to the shaft.

2. In combination, a shaft having a flattened portion, a head having an aperture for the reception of the shaft and a socket the axis whereof is angularly disposed to the axis of the aperture and arranged to receive the end of an operating member, a gib member surrounding the head in operative relation to the flattened portion of the shaft, and a nut having threaded connection with the head for forcing the gib member into engagement with said flattened portion.

3. In combination, a shaft having a flattened portion, an operating member, a head having an aperture for the reception of the shaft and a socket the axis whereof is at substantially right angles to the axis of the aperture and arranged to receive the end of said operating member, the head and operating member having aligning holes, a pin in said holes, a gib washer surrounding the head and disposed in operative relation to the flattened portion of the shaft, and a sleeved nut having threaded connection with the head for forcing the gib washer into engagement with said flattened portion of the shaft, the sleeved nut being designed to enclose the portion of the head having the pin receiving hole.

4. In combination, a shaft having a flattened portion, a head having an externally threaded socketed shank, an operating member having its end fitted within the said socket, the shank and operating member having aligning apertures, a pin within said apertures, a gib washer surrounding the head and disposed in operative relation to the flattened portion of the shaft, and a sleeved nut enclosing and operable along the shank for forcing the gib washer into engagement with the aforesaid flattened portion of the shaft.

In testimony whereof, I hereunto affix my signature.

JOHN H. WILLIAMS.